March 4, 1930.  C. F. McGLASHAN  1,749,497
BIRD LURE
Filed March 12, 1929
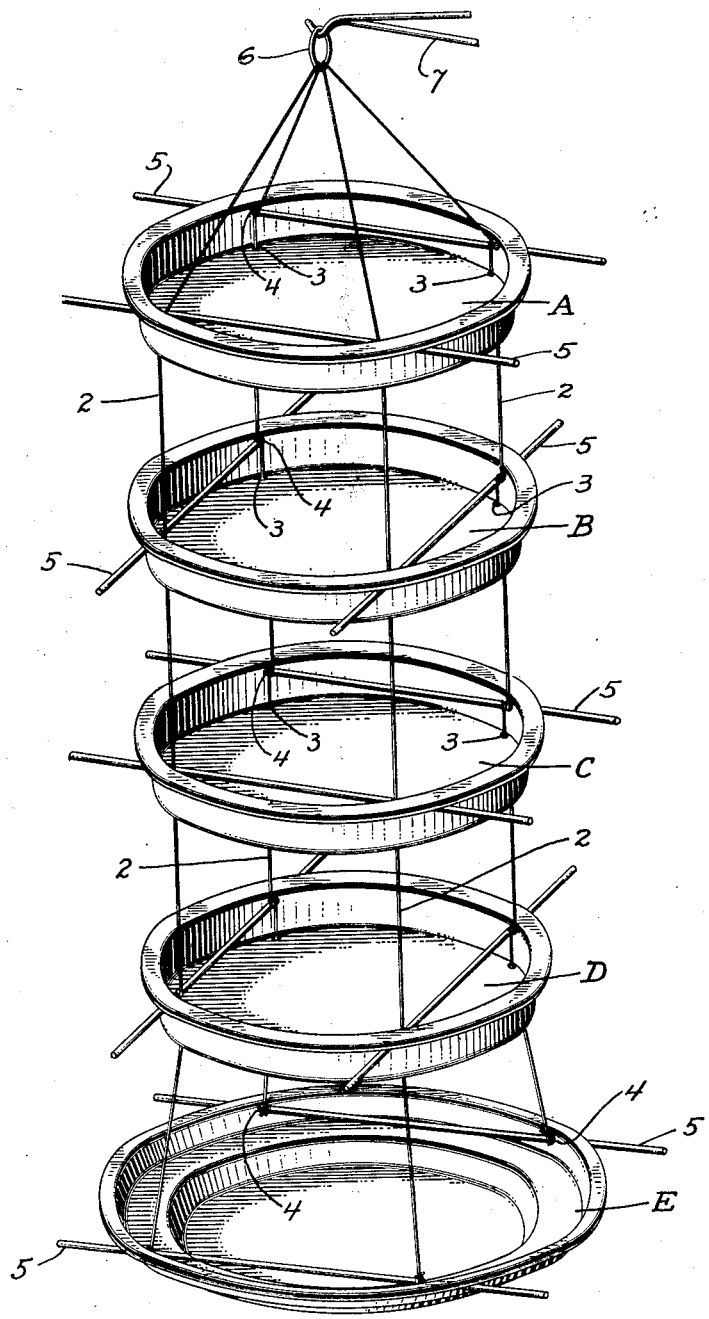
INVENTOR.
Charles F. McGlashan.
BY
Townsend, Loftus + Abbett
ATTORNEYS.

Patented Mar. 4, 1930

1,749,497

UNITED STATES PATENT OFFICE

CHARLES F. McGLASHAN, OF TRUCKEE, CALIFORNIA

BIRD LURE

Application filed March 12, 1929. Serial No. 346,434.

This invention relates to a bird lure, and especially to a lure which is adapted to be suspended outside a window or from posts or trees and from which wild birds may be fed without being in danger of cats or other animals of prey.

Individuals, associations, municipal governments and States spend vast sums of money in feeding famishing birds during periods of heavy snows, during migratory seasons, and whenever occasion demands. Untold numbers of housewives feed every scrap, crumb and morsel of food to birds and teach their children to do so year after year. Individuals who shudder at keeping birds in captivity purchase grain and feed to feed wild birds and to attract them to their window sills and doors—in fact, inhabitants of cities can scarcely realize the almost universal custom of feeding birds which prevails in the rural districts.

The placing of feed for wild birds on the ground, on a shelf or table attracts the birds, but they are in danger and in constant fear of enemies such as cats and other animals of prey that cannot be seen without special effort, and hence the birds cannot be fully studied and appreciated.

Everybody is interested in watching the birds feed, noting the peculiarity of their actions, color, species and characteristics. The good that is done by supplying birds with food, especially those migrating and not knowing where to find desirable suste-nance and those which, from climatic conditions such as snows and storms, are unable to obtain food essential to sustain life; provides joy and happiness to people who are the donors; it educates the masses to become familiar with different varieties of birds; it teaches them the love of birds and a spirit of true charity by giving food to helpless creatures.

A great number of people, particularly in the rural districts provide bird boards for the purpose of feeding and attracting birds but it is surprising how few birds can be fed from a single board, as it depends upon the peculiarities of the species as to whether one or more will eat peacefully from the same board in company with other birds. Birds of many species will not eat on the same board with another bird. One bird will monopolize a board unless his or her mate happens along, in which case they will feed together. Even though a bird board be fairly large there are birds that will allow no intruder, and will stop eating to fight, and the victor will hold the field. On the other hand, some varieties are companionable and as many will eat together as can crowd on the board, but it is safe to say that the general rule is one bird to a board.

The purpose of the present invention is to provide a bird lure which will not only attract wild birds of all varieties, but which will also provide ample food and protection for all by permitting a considerable number of birds to feed at the same time in more or less seclusion and peace, the object being to generally improve and simplify the construction and operation of bird lures; to provide a bird lure which is especially intended for feeding wild birds of different varieties; to provide a lure which is adapted to be suspended in front of a window or from trees, posts or like elevated positions so that the birds can feed in perfect safety from cats or other animals of prey; and further to provide a lure which is adapted to contain a considerable number of feeding pans elevated and separated with relation to each other so that a number and variety of birds may feed without fighting or disturbing each other. The bird lure is shown by way of illustration in the accompanying drawing, the drawing being a perspective view of the bird lure.

By referring to the drawing it will be noted that the bird lure consists of a series of suspended interspaced feeding pans such as indicated at A, B, C, D and E. These pans are connected by wires or rods, such as indicated at 2, the wires or rods passing through perforations 3 formed in the bottom or the flanges of the pans and being secured with relation to each pan by soldering or other means so as to maintain a fixed spacing between the pans, and also to prevent tilting of the pans. The rim of each pan should be vertical or slightly inwardly inclined so as to retain the feed placed therein and also to prevent the wind from blowing the feed out of the pans. The rims are also perforated, as indicated at 4 and these perforations permit perch rods, such as indicated at 5, to be passed through the rims and to be supported thereby. These perches are important as they keep the birds from alighting directly in the pans. The natural tendency of wild birds is to sit on limbs or perches, hence the perches serve two important functions—first that of attracting the birds by providing perches for them to alight on, and secondly by providing perches whereupon they may sit while feeding, thus keeping them out of the pans proper. Feeding pans will not readily attract wild birds unless they are equipped with perches upon which to alight when approaching food, and upon which they will rest while feeding. Experience shows that these perches should be as low in the pan as possible so that while sitting on the perches the birds can readily reach the food.

The lowermost pan shown at E is preferably larger in diameter than the other pans. It may contain water from which the birds may drink, and it could also serve as a bird bath, and again it may function as a catch basin to catch food or feed which is spilled from the other pans. The wires connecting the several feed pans are connected to a ring or the like, such as shown at 6, and as such may be hung from a hook or bracket indicated at 7. The bracket may be attached to the side of a window, to a post or a wire may be passed through the ring 6 so that it may be suspended from the limbs of a tree or the like. It is desirable to suspend the bird lure at an elevated point as the birds are in this manner protected from cats and other animals of prey and can thus feed in peace without being in fear of enemies.

A bird lure of this character first of all provides a safe feeding place for wild birds of many varieties; it permits a considerable number of birds to feed at the same time, as one or more birds may feed from each pan; the elevated position of the bird lure and feeding device insures safety; the perches employed attract the birds and also keeps them out of the pans. The bird lure when hung in front of a window has proven to be of great educational value as it permits close study and observation of different varieties of birds. It teaches true charity by giving food to helpless creatures and gives happiness to a person who is an invalid, a convalescent, bedridden, or who could not watch them without rising from a chair or bed. It has been found that the birds pay little attention to individuals within a room. The window pane evidently causes them to feel perfectly safe.

The bird lure is artistic in appearance, as the pans may be highly ornamented or painted in bright colors or otherwise, bright colors having been found to attract the birds.

While certain features of the present invention are more or less specifically described, I wish it understood that various changes may be resorted to within the scope of the appended claims, similarly, that the materials and finishes of the several parts employed may be such as the manufacturer may decide, or varying conditions or uses may demand.

Having thus described my invention, what I claim and desire to secure by Letters Patent is:

1. A bird lure comprising a plurality of superposed interspaced pans for the reception of bird feed, and perch rods supported by each pan, extending crosswise thereof and projecting outwardly therefrom.

2. In a device of the character described a feeding pan, said pan comprising a bottom a feeding pan, said pan comprising a bottom section, an annular upwardly extending rim formed thereon, said rim having aligned perforations formed therein and perch rods extending through the perforated portions of the rim and supported by the rim.

3. In a device of the character described a feeding pan, said pan comprising a bottom section, an annular upwardly extending rim formed thereon, said rim having aligned perforations formed therein, perch rods extending through the perforated portions of the rim and supported by the rim, said perch rods extending crosswise of the pan and extending beyond the peripheral edge thereof to form alighting perches for birds.

CHARLES F. McGLASHAN.